United States Patent [19]
Mauleon et al.

[11] 3,998,982
[45] Dec. 21, 1976

[54] METHOD OF CUTTING AND GRINDING POROUS PEN TIPS

[75] Inventors: Diosdado M. Mauleon, Los Angeles; Henry Peper, Jr., Pacific Palisades, both of Calif.

[73] Assignee: The Gillette Company, Boston, Mass.

[22] Filed: June 2, 1975

[21] Appl. No.: 582,599

[52] U.S. Cl. .................................. 427/230; 83/22; 264/138; 264/145; 264/157; 264/162; 264/232; 264/296; 264/297; 264/340; 427/293

[51] Int. Cl.[2] .................... B29C 17/10; B29C 17/14

[58] Field of Search ............... 83/22; 401/196, 198, 401/283; 264/138, 141, 142, 148, 150, 151, 157, 162, 171, 173, 177, 209, 210 F, 182, 145, 232, 294, 297, 340, 296; 427/289, 230, 293

[56] References Cited

UNITED STATES PATENTS

| | | | |
|---|---|---|---|
| 2,182,193 | 12/1939 | Blaschke | 83/22 |
| 2,994,923 | 8/1961 | Eddy | 83/22 |
| 3,400,998 | 9/1968 | Daugherty et al. | 401/198 |
| 3,480,372 | 11/1969 | Kenny et al. | 401/198 |
| 3,558,392 | 1/1971 | Goodenow et al. | 401/198 |
| 3,895,133 | 7/1975 | Fleisig et al. | 401/196 |

*Primary Examiner*—Willard E. Hoag
*Attorney, Agent, or Firm*—Poms, Smith, Lande & Glenny

[57] ABSTRACT

A method of increasing the resistance of delicate, elongated objects made of polymeric compositions, to fracturing, shattering, and splintering during application of stress forces during cutting, shearing or grinding, thereby permitting the formation of shorter finished objects with appropriately and smoothly contured ends from a long stock object. Differently stated, the present invention relates to a method of preparing an elongated, rod-like object composed of several plastic, polymeric compositions, having channels formed therein and extending longitudinally thereof, for subsequent cutting of such long object into short lengths with desirably shaped end surfaces.

2 Claims, No Drawings

METHOD OF CUTTING AND GRINDING POROUS PEN TIPS

At present our civilization employs millions of writing instruments and the preferred ink supplying and writing tip of such instruments includes the cylindrical imperforate outer case about a body portion having a plurality of longitudinally extending ink conveying channels generally in the form of radially extending arms from an axial center to within a short distance from the surface of the outer cylindrical case. These radial arms provide channels generally of capillary width, through which ink from a reservoir is transferred to the writing end of the tip. The polymer body walls of these channels are very thin and when the writing tip has six to twelve radial longitudinally continuous channels within a case having an outside diameter of less than 0.1 inch, one can readily appreciate that man is dealing with a delicate article that shatters into shards when cut into short lengths or cut and ground in an attempt to form a conical or convex or other suitably contoured end surface thereon.

The stock material from which these writing elements are made is preferably an extruded stock in the form of a continuous rod, the extrusion process suitable for the production of such products being well described in U.S. Pat. No. 3,778,495. The stock material is generally made of polymeric compositions which are extruded under exotic conditions with exquisite controls and by the use of meticulously designed dies to continuously form hundreds of feet of the elongated body material or rod having the imperforate casing and the precisely formed longitudinally extending and numerous ink conveying channels of desired widths and locations.

In commercial practice it was not unusual to find that 25–50% of the short writing tips which have been severed from a parent continuous stock, had been fractured and shattered by the shearing, cutting and grinding of the continuous elongated stock into short lengths. When so shattered, the designed ability to convey ink from a reservoir to paper is impaired and performance characteristics are incapable of attainment. Since the scientifically contoured writing tip surfaces were also shattered and the desired smooth surfaces now had sharp, jagged shards and loose portions which impeded instead of facilitating smooth writing, necessitated rejection of as high as 50% of the product. Changes in character of grit of abrasives, saws and grinding wheels, types of cutting and shearing tools and other expedients did not reduce the high percentages of shattered and spoiled writing instrument tips.

The answer to the problem was found in filling the internal channels and capillaries of the extruded rod material with a liquid before subjecting the rod material to stresses designed to produce the desired contoured surfaces. Various liquids and solutions can be employed. The liquids should preferably be compatible and miscible with the inks to be eventually employed. The viscosity of the liquid used should not be high and aqueous solutions are very effective. The use of a dye in the aqueous medium is effective in providing a visual indication as to the extent and completeness of permeation and filling of the cavities in the rod material with the liquid. A minor content of surfactant is sometimes deemed effective in expediting the assimilation of the solution by the rod material. Various means of filling the channels of the rod material with liquid can be used but pressurizing methods or use of vacuum are burdensome and the least expensive (but more time consuming method) is to simply place one end of the long rod mateial into the liquid and let capillary action move it into all of the channels, coloration by the liquid, usually visible through the case of polymeric composition of the rod, indicating complete filling of the voids.

As previously indicated, the stock material can be made from a number of different thermoplastic polymer compositions among them being the acetal polymers such as polyoxymethylene known as Delrin (TM), polyamides such as various types of nylon, polypropylene, and acrylic polymers such as polyacrylonitrile and polymethacrylate. All of these compositions are relatively strong in solid form, have a low coefficient of friction with respect to paper and other solids, and are relatively light in color. Unfortunately, they are also brittle and subject to the crushing heretofore described.

By filling the voids within the rod material with liquid before cutting or shearing the rod into required short lengths and trimming or grinding the ends to desired shapes, the percentage of rejects has been dramatically minimized if not completely eliminated. A clue as to the underlying reasons for the unexpected but highly desirable result was attained by repeated tests on the radial crushing strength of four inch sections of extruded writing tip rod made of acetal polymer, the rod being 0.097 inches in outer diameter. The median one-half inch portions of each four inch test specimen was placed on the anvil on an INSTRON testing machine. The ends of the four inch specimen were open but water had been permitted to fill the capillary channels of one specimen of each pair, the specimens fractured and split at the following loads:

| Dry and Unfilled | Water Filled |
|---|---|
| 38.2 lbs. average | 125.7 lbs. average |

Other representative tests with water-filled specimens indicated that the average maximum load before crushing was on the order of about 196 lbs. whereas with the water blown out the average dropped to 182 lbs. The blowing out of the water was incomplete since the original dry samples before being water filled failed at loads of less than 70 lbs. Other tests clearly showed that the presence or absence of liquid on the outer surface of the object does not change the results to an appreciable extent. Other tests also show that simply soaking the extrusions with the ends sealed was of no value and that the temperature levels at which the operations were carried out did not influence the result to a significant extent.

The use of wetting agents in the void filling solutions did not indicate advantages of a conclusive nature. The use of vacuum to expedite the impregnation and filling of the formed capillaries and voids in the extruded rod indicated a reduction in the time required for this step, but its utilization was subject to question on economic grounds. There was no question however with respect to the improved quality and increased output of smooth writing tips for writing instruments by the use of the method here described. Drying of the cut and contoured finished tips prior to insertion into a writing instrument is not essential since the amount of filling liquid in the writing tip is minute and generally used up in a single preliminary writing doodle, but the use of a filling liquid similar in color to and miscible with the ink to be used in the pen is highly desirable in simplifying manufacturing procedures.

We claim:

1. The method of forming a writing tip for a pen having plural, longitudinal capillary channels therein, comprising: filling plural, longitudinal capillary channels in an extruded plastic rod with a liquid which is compatible and miscible with ink subsequently to be used in the pen to increase resistance of said rod to radial crushing and then while said capillary channels are filled with said liquid both transversely cutting said rod into plural short pieces and grinding end surfaces of said pieces to shape them into writing tips.

2. A method as stated in claim 1 wherein the filling of said channels is obtained by dipping one end of the object in the liquid.

* * * * *